United States Patent

[11] 3,604,653

[72] Inventor George Anthony Sargent
P.O. Box 26, Veneta, Oreg. 97487
[21] Appl. No. 20,291
[22] Filed Mar. 17, 1970
[45] Patented Sept. 14, 1971

[54] LINE-WINDING DEVICE FOR SPINNING REELS
4 Claims, 5 Drawing Figs.

[52] U.S. Cl. .................................................. 242/84.2 R
[51] Int. Cl. ..................................................... A01k 89/00
[50] Field of Search ........................................... 242/84.1 R,
84.2 R, 84.2 G, 84.21 R, 84.1 K

[56] References Cited
UNITED STATES PATENTS
2,639,869  5/1953  Levine .......................... 242/84.1 R
3,298,127  1/1967  Bedell .......................... 242/84.1 R Primary Examiner—Billy S. Taylor
Attorney—James D. Givnan, Jr.

ABSTRACT: A device for attachment to the spool of a spinning reel is disclosed as having a plurality of diverging fingers for gripping the spool at circumferentially spaced-apart points. Additional means functions to secure the fingers on the spool for subsequent spool rotation for the winding of line onto the freely rotating spool while the reel bail remains stationary whereby twisting of the line is avoided.

PATENTED SEP 14 1971 3,604,653
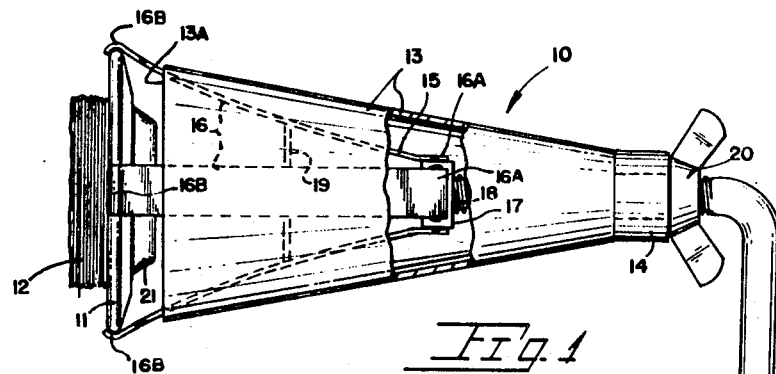
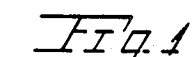
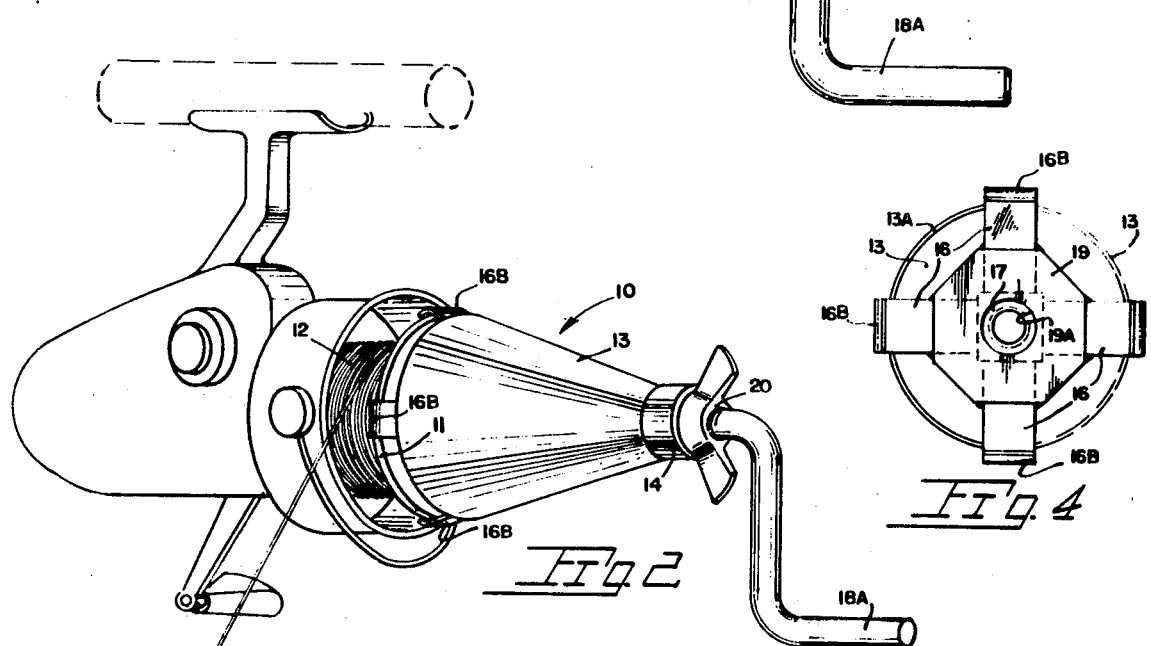
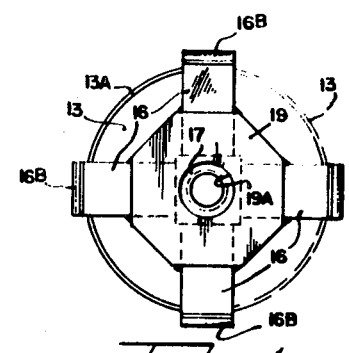
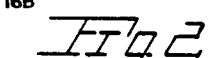
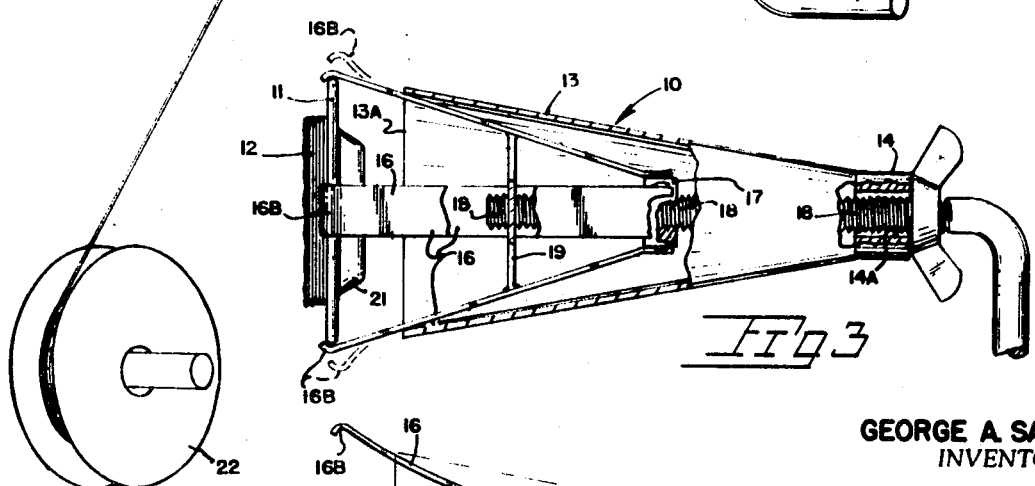
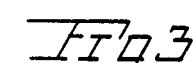
GEORGE A. SARGENT
INVENTOR.
BY
AGENT
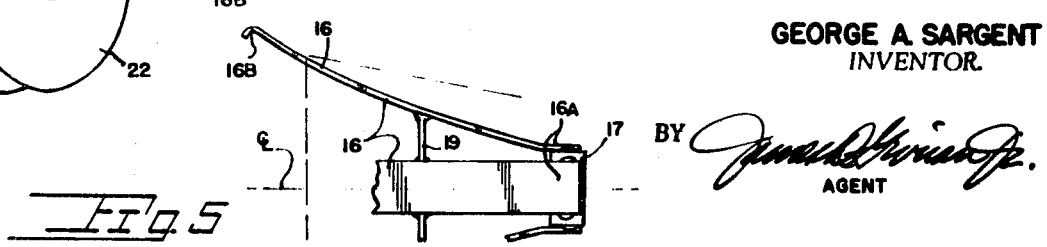

LINE-WINDING DEVICE FOR SPINNING REELS

BACKGROUND OF THE INVENTION

The present invention relates generally to fishing reels and more specifically to such reels of the spinning type which have their supply of line coiled perpendicular to line travel. The present invention is embodied in an attachment to a spinning reel for the adding of line thereto.

A characteristic of spinning reels and particularly those of the open face type is a stationary reel body with the line being wound on the reel by an orbiting bail member. It is well known that the addition of new line onto the spool of a reel by means of the orbiting bail will cause an undesired twist to be imparted the line. For this reason it is conventional practice to remove the spool from the spinning reel and manually wind the spool to install new line. The removal of the spool from the reel, manual winding of the line thereon and reinstallation of the spool take a considerable amount of time even under ideal circumstances and is extremely inconvenient when done in the out-of-doors.

For line replacement, interchangeable reel spools are sometimes carried by the fisherman for ready installation on the reel. This practice is unsuitable to most fishermen in that it is costly and still requires removal and reinstallation of a spool onto the reel incurring the risk of dirt getting into the reel mechanism.

SUMMARY OF THE INVENTION

The present invention is embodied in a device for rotating the spool of a spinning reel while in place on the spinning reel for the direct addition of new line to the reel and avoiding twisting passage through the orbiting bail of the reel. Included in the invention are metal fingers engageable with the spool to enable rotation to be imparted to same.

It is an important object of the present invention to provide a readily attachable device mountable upon any size spool for lockable attachment thereto. Reels of the present description conventionally include a drag adjustment to permit reel rotation and paying out of the line incident to the pull of a hooked fish. This drag adjustment is variable and for purposes of the present invention is lessened for free wheeling reel rotation prior to attachment of the present device to the reel spool.

BRIEF DESCRIPTION OF THE DRAWING

In the accompanying drawings:

FIG. 1 is a side elevational view of the rewinding attachment for spinning reels shown operatively attached to a fragment of a spinning reel spool, FIG. 2 is a perspective view of the present device in place on a spinning reel spool for resupplying said spool from a new line spool, FIG. 3 is a view similar to FIG. 1 with the fingers of the device extended for initial contact with the spool of the spinning reel, FIG. 4 is an end elevational view of the left-hand side of FIG. 3 with the spool removed, and FIG. 5 is a side elevational view of the finger assembly removed from the cone.

DESCRIPTION OF THE PREFERRED EMBODIMENT

With continuing reference to the accompanying drawings wherein applied reference numerals indicate parts similarly identified in the following specification, the reference numeral 10 indicates generally the present device for attachment to the front rim 11 of a spinning reel spool 12. The device rotates in a unitary manner with the reel mounted spool and is fully supported thereby during rewinding.

Finger closing means are indicated at 13 disclosed in the general shape of a conical body terminating rearwardly in a boss 14.

Substantially enclosed by the conical body is a finger assembly 15 having forwardly projecting fingers 16. The plural metal fingers 16 are secured as by welding at their innermost, converging ends 16A to an internally threaded block 17.

The fingers 16 project outwardly and terminate forwardly in inwardly directed ends at 16B for gripping contact with front rim 11 of the spinning reel spool 12. Extension of the finger ends by later described means enables their displacement in a radial direction allowing placement thereof about the rim 11. As shown in FIG. 5 a typical finger 16 diverges outwardly away from the center axis of the finger assembly 15 to assure biased contact with the cone circumferential edge indicated at 13A. Accordingly upon extension of assembly 15 and specifically the fingers 16, the ends thereof move in a radial direction. Interposed between the fingers 16 is a stiffener plate 19 transversely disposed of the major axis of the device and apertured at 19A (FIG. 4). The plate 19 serves to retain the fingers 16 in a diverging relationship. The fingers, in the present disclosure, each comprise a resilient metal strip. The stiffener plate 19 may be dispensed with when the fingers 16 are of heavy gauge metal.

Controlling relative movement of the finger assembly 15 and the finger closing means 13 is a threaded shaft 18 constituting adjustment means and in threaded engagement adjacent its forward end with the block 17. Offset means in the form a fingergrip 18A, integral with the shaft 18 facilitates rotation of the entire device when operatively disposed on the spool 12. Included in the adjustment means is a wing nut 20 carried by the threads 18A and serves to limit the axial movement of the shaft 18. A further function of wingnut 20 resides in the user of the device means being able to forcefully urge the cone-shaped closing means 13 against the fingers 16 as a final step of the attachment to assure their secure grip on the spool edge 11.

The operation of the present device is as follows. Upon removal of the old fishing line from the reel carried spool 12 the reel's drag adjustment is reduced to the extent that the spool is now rotatable in a freewheeling manner relative to the remainder of the reel structure. This drag release is accomplished by a manually adjusted drag mechanism conventional in all spinning reels of the present type. In the reel shown and particularly in regard to the spool thereon such adjustment is achieved by manipulation of the spool in a counterclockwise direction by means of a finger grip 21 on the spool.

Subsequent to the above described reducing of the spool's drag the present device is mounted on the spool reel 11.

The fingers 16 are projected outwardly of the cone by a counterclockwise rotation of threaded shaft 18A with the ends 16B of the fingers ultimately being disposed for engagement with the spool rim 11. For purposes of conveniently attaching the finger ends 16B, said ends should be rotated so as to require a slight flexing of their associated fingers 16 to secure the attachment. Rotation of threaded shaft 18A by manual turning of handle 18A pulls block 17 inwardly causing the forward edge 13A of the cone to further bias each of the fingers 16 ultimately causing forceful gripping of their ends against the spool rim 11. Additional relative movement between the cone and the fingers 16, if necessary, may be achieved by subsequent advancement of the wingnut 20 against boss 14 of the cone.

Accordingly, upon attachment of the device to spool 12 both the spool and device will rotate in a coaxial manner with the remaining portion of the reel remaining stationary.

The line to be added is shown on the customary storage spool 22 which may be temporarily supported during line transfer on some sort of spindle.

The finger closing means while shown as a conical structure may be of other configuration without departing from the present invention.

Having thus described the invention what I desire to secure under a Letters Patent is:

1. A line-winding device for attachment to the reel mounted spool of a spinning reel for imparting rotational line winding movement to the spool, said device comprising, a finger assembly including forwardly extending fingers adapted at their forward ends to engage the rim of the spinning reel spool, finger-closing means disposed about said fingers and in contact therewith at a point rearward of their forward ends, adjustment means coacting on said finger assembly and the finger closing means to cause said fingers to be biased into gripping contact with the spool rim attaching the device to the spool for subsequent rotation of the spool while the bail of the reel remains stationary, offset means constituting a finger grip for imparting rotation to the device and the reel spool.

2. The device as claimed in claim 1 wherein said fingers diverge forwardly and said finger closing means is advanced therealong by the adjustment means to bias the fingers inwardly.

3. The device as claimed in claim 2 wherein said adjustment means includes a threaded shaft extending through said finger assembly and said finger closing means and rotatable for relative movement between the closing means and the finger assembly.

4. The device as claimed in claim 3 wherein said adjustment means additionally includes a nut element in bearing contact with said finger closing means.